T. LUMSDEN.
TOOL HOLDER FOR TOOL GRINDING MACHINES.
APPLICATION FILED OCT. 30, 1915.
1,185,219.
Patented May 30, 1916.
3 SHEETS—SHEET 1.
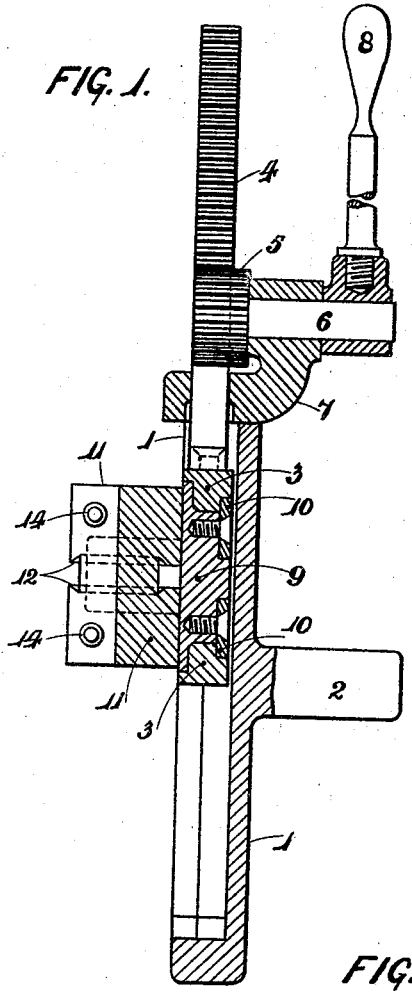
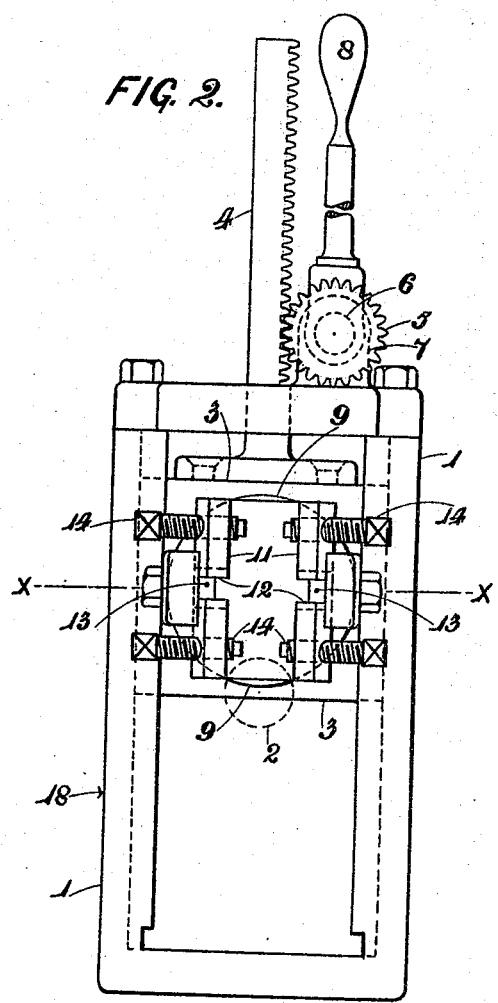
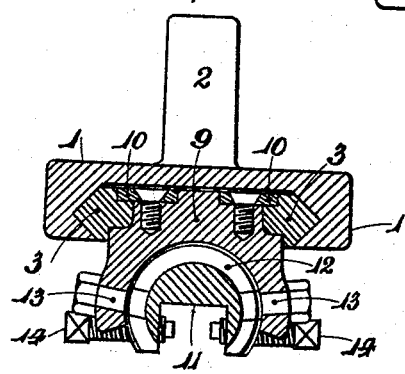
INVENTOR:
Thomas Lumsden
BY Mr Wallace White
ATTY.

T. LUMSDEN.
TOOL HOLDER FOR TOOL GRINDING MACHINES.
APPLICATION FILED OCT. 30, 1915.
1,185,219.
Patented May 30, 1916.
3 SHEETS—SHEET 3.
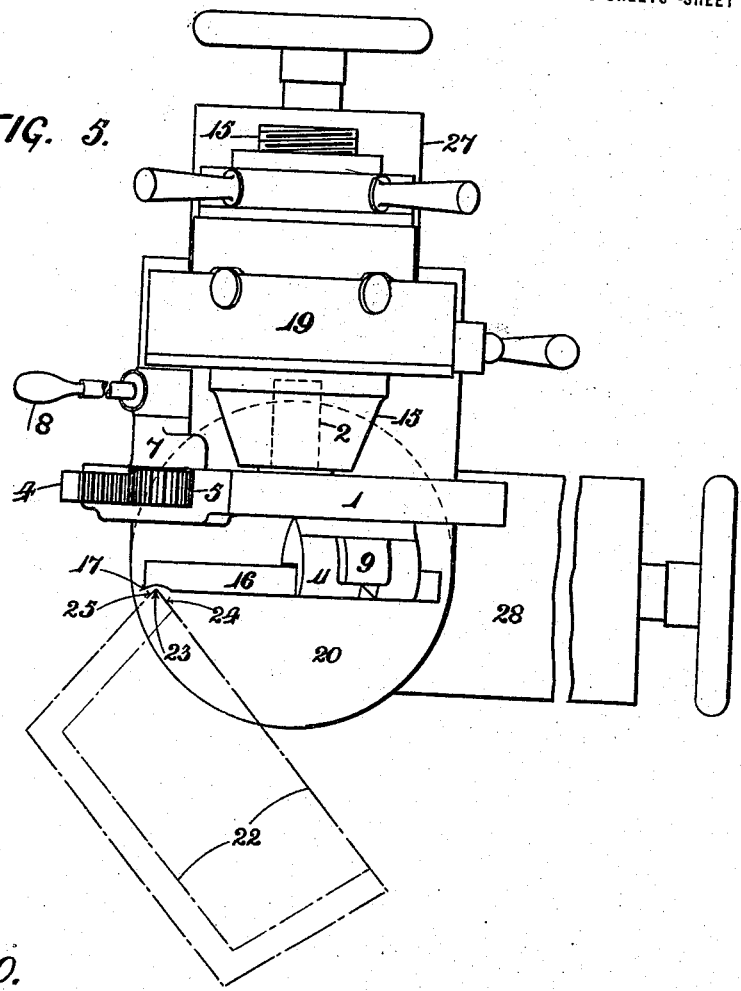
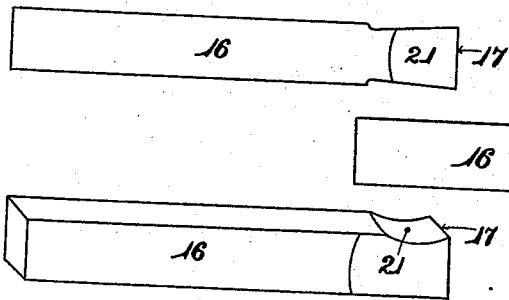
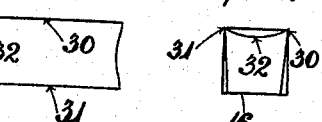
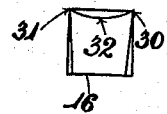
INVENTOR:
Thomas Lumsden
By Wallace White
ATT'Y.

UNITED STATES PATENT OFFICE.

THOMAS LUMSDEN, OF GATESHEAD, ENGLAND.

TOOL-HOLDER FOR TOOL-GRINDING MACHINES.

1,185,219.  Specification of Letters Patent.  Patented May 30, 1916.

Application filed October 30, 1915. Serial No. 58,787.

*To all whom it may concern:*

Be it known that I, THOMAS LUMSDEN, a subject of the King of Great Britain and Ireland, residing at Gateshead, in the county of Durham, England, have invented new and useful Improvements in Tool-Holders for Tool-Grinding Machines, of which the following is a specification.

This invention relates to tool-holders for grinding machines for grinding the tools of lathes, planing, slotting, shaping and similar large machine tools.

According to this invention I provide a tool-holder capable of universal angular adjustment in relation to the grinding wheel so as to present the tool to be ground to the usual cup-shaped rotary grinding wheel of a grinding machine in such a manner that the tool will be hollow-ground (*i. e.* ground so as to produce a concave surface in the face or top angle of the tool), this method of grinding producing a tool which is very efficient in use, said tool-holder also being capable of producing internal-radius tools, that is tools having a concave cutting surface.

In one arrangement of tool-holder in accordance with this invention I employ a tool-holder of the type comprising a turn-table, means whereby said turn-table can be traveled toward or away from and across the grinding wheel, an annular carrier carried by said turn-table, and a hollow block, barrel or member mounted in said annular carrier and angularly adjustable therein. In cases where the grinding wheel of the grinding machine is provided with means whereby it can be traveled toward and away from and across the tool, the means for traveling the turn-table above referred to may be dispensed with.

In combination with the above defined tool-holder, I employ an attachment adapted to be clamped in the hollow block or member of the tool-holder, said attachment comprising a frame, a carrier slidably mounted and adapted to be reciprocated in said frame, a block mounted and angularly adjustable in said sliding carrier, and means for clamping the tool to be ground to said block, or to a jaw or part carried thereby. The attachment provides a means whereby the tool can be reciprocated diagonally across the cutting edge of the grinding wheel.

I will fully describe my invention with reference to the accompanying drawings wherein—

Figure 4:
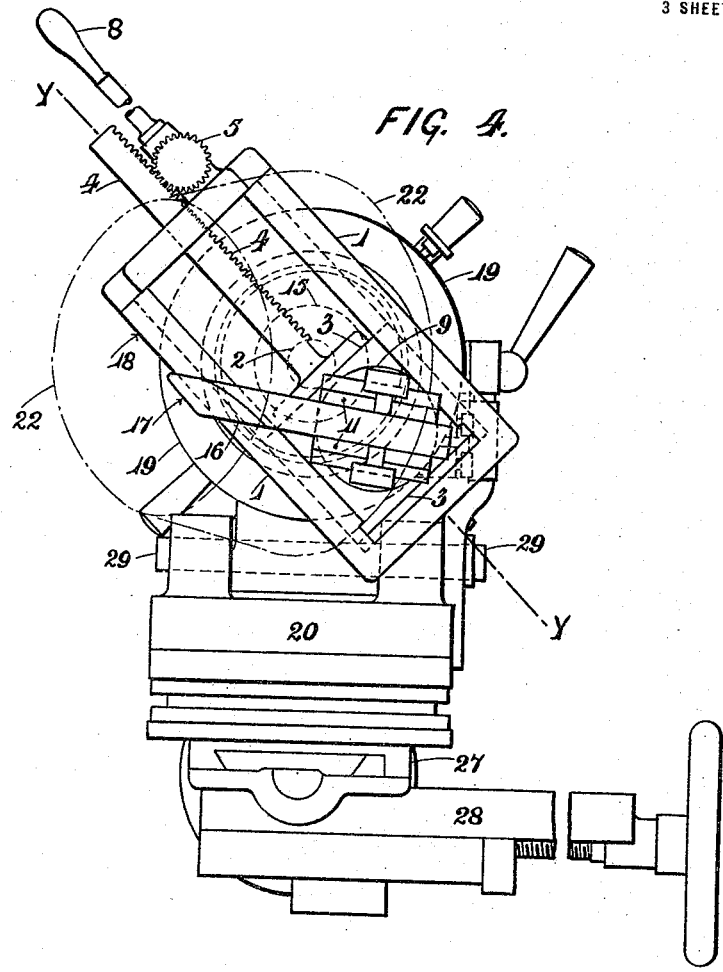
Figure 6:
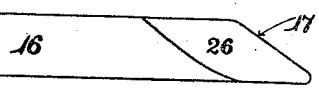
Figure 8:
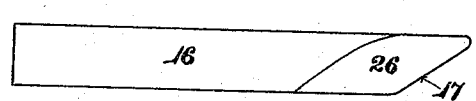
Figure 7:
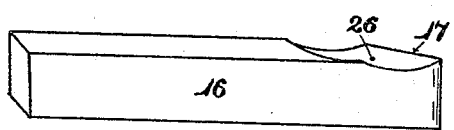
Figure 9:
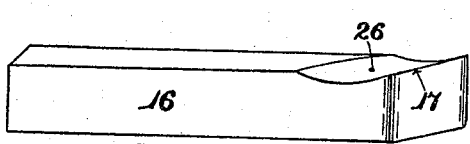

Figure 1 is a sectional elevation of one construction of attachment in accordance with my invention; Fig. 2 is a front elevation at right angles to Fig. 1; and Fig. 3 is a section on the line X—X in Fig. 2. Figs. 4 and 5 are a front elevation and a plan respectively of a tool-holder of the type herein referred to with my attachment fitted; and Figs. 6 to 13 illustrate, by way of example, four tools produced by a tool-holder fitted with my attachment, Fig. 6 being a plan and Fig. 7 a perspective elevation of one tool; Figs. 8 and 9 similar views of a second tool; Figs. 10 and 11 similar views of a third tool; and Fig. 12 a plan and Fig. 13 an end elevation of a further tool.

Referring to Figs. 1, 2 and 3 of the drawings, the attachment therein illustrated comprises a frame 1 provided with a spindle 2. Slidably mounted in the frame is a carrier 3 to the upper end of which is attached a rack 4. Co-acting with the rack 4 is a pinion 5 the spindle 6 of which is supported by a bracket 7 on the frame 1 and has a hand lever 8 whereby said pinion can be rotated. Rotatably mounted on the sliding carrier 3 is a block 9 which is secured in position by a fitting ring 10. The block 9 carries a jaw 11 which is provided with a dove-tailed groove 12 with which co-act wedge-shaped bolts 13 so that said jaw can be rotated in said block about an axis which is at right angles to the axis about which the block 9 can be rotated. Set screws 14 are provided for clamping the tool to be ground in position in the jaw 11.

It will be seen that a tool clamped in the jaw 11 can be adjusted in the frame 1 as follows:—(*a*) The tool can be angularly adjusted about the axis of the jaw 11; (*b*) the tool and jaw can be angularly adjusted about the axis of the block 9; and (*c*) the tool, jaw and block can be rectilinearly reciprocated in the frame 1.

In use, the spindle 2 of the frame 1 is clamped in the hollow block or member 15 of the tool-holder of the type hereinbefore referred to, as shown in Figs. 4 and 5. The tool 16 to be ground is clamped in the jaw 11 by means of the set screws 14 (Figs. 1, 2 and 3) and is adjusted, by rotating the block 9 in the sliding carrier 3, to bring its cutting edge 17 parallel to the edge 18 of the frame 1 as shown in Fig. 4, *i. e.* parallel to the line of reciprocation of the sliding carrier 3.

The hollow block 15 of the tool-holder is angularly adjusted in its annular carrier 19 to incline the frame 1 to one side or the other for right or left hand tools. The radius of the concave surface which is to be ground in the face or top of the tool is controlled by the angle of inclination of the frame 1. I have found by experiment that with a grinding wheel having an external diameter of 12 inches, when the frame 1 is adjusted so that its center line Y—Y, Fig. 4 (the line of reciprocation) makes an angle of 45° with the vertical, the radius of the concave surface ground in the face of the tool is approximately 3 inches. An angle of 25° gives a radius of approximately 1½ inches, and an angle of 15° gives a radius of approximately 1 inch. It will of course be understood that the radius obtained when the frame 1 is adjusted to a given angle will vary somewhat as the condition of the cutting edge of the grinding wheel varies. The radius obtained when the cutting edge is sharply angular will be smaller than that obtained when the cutting edge becomes rounded off by wear. In Fig. 4 the center line of the frame 1 is at an angle of 45° to the vertical.

The slope or inclination of the concave surface to be ground in the face or top angle of the tool is controlled by the angular adjustment of the turn-table 20 of the tool-holder. To produce a concave surface without slope, *i. e.* parallel to the cutting edge 17 of the tool, such as the concave surface 21 of the tool illustrated in Figs. 10 and 11, the turn-table is adjusted so that the line of the axis of the hollow block 15 (or a line parallel thereto) bisects the angle of the cutting edge of the grinding wheel. In the grinding wheel indicated at 22 in dot-and-dash lines in Figs. 4 and 5, the angle of the cutting edge 23 (Fig. 5) is about 82°, and to obtain a concave surface without slope the turn-table must be adjusted so that the line of the axis of the hollow block 15 or a line parallel thereto bisects the angle of the cutting edge and makes an angle of 41° with both the face 24 and the side 25 of the grinding wheel. The point of contact of the tool and cutting edge is where the horizontal diameter of the grinding wheel cuts the cutting edge. To obtain a sloped concave surface, such as the concave surfaces 26 of the tools illustrated in Figs. 6 and 7 and in Figs. 8 and 9, the angle of the axis of the block 15 (or a line parallel thereto) to the face of the grinding wheel must be increased or decreased by further adjusting the turn-table 20.

Having made the necessary adjustment for the radius and slope of the concave surface, the tool is brought up to the cutting edge of the grinding wheel by traveling the tool-holder by means of the compound slides 27 and 28. Where the grinding machine is of the type having a non-traveling turntable and a grinding wheel adapted to be moved toward or away from and across the tool, the grinding wheel will be traveled to bring its cutting edge up to the tool. The concave surface can then be ground in the face or top angle of the tool by reciprocating the carrier 3 to travel the tool diagonally across the cutting edge of the grinding wheel by means of the pinion 5 and rack 4.

In the attachment illustrated in the drawings, the jaw 11 can be rotated in the block 9. This provides an alternative adjustment to that provided by the turntable 20 of the tool-holder. In the tool-holder illustrated in Figs. 4 and 5, the annular carrier 19 is mounted and angularly adjustable about a pivot 29 (Fig. 4) carried by the turntable 20. This adjustment is not essential except for cranked tools with which it is necessary to bring the edge of the tool in line horizontally with the axis of the grinding wheel.

Figs. 12 and 13 illustrate a hollow ground tool having two cutting edges 30, 31 having a concave surface 32 between them which can be produced by a tool-holder fitted with my attachment.

As will be obvious, internal radius tools can also be produced by means of a tool-holder fitted with my attachment, the said tool-holder and attachment rendering a tool-grinding machine capable of grinding any concave surface necessary in the face or angle of a tool.

What I claim and desire to secure by Letters Patent is:—

1. For tool-grinding machines a tool-holder, means for reciprocating the tool-holder, and means for giving universal angular adjustment to the holder for the purpose of grinding a concave surface on a tool.

2. The combination with a tool-holder of the type comprising a turntable, an annular carrier carried by said turntable, and a hollow member mounted in said annular carrier and angularly adjustable therein, of means for traveling the tool to be ground diagonally across the cutting edge of the grinding wheel for the purpose of grinding a concave surface in the face of the tool.

3. For tool-holders of the type comprising a turntable, an annular carrier carried by said turntable, and a hollow member mounted in said annular carrier and angularly adjustable therein, an attachment comprising a frame adapted to be clamped in the hollow member of the tool-holder, a carrier slidably mounted and adapted to be reciprocated in said frame, a block mounted and angularly adjustable in said sliding carrier, and means for clamping the tool to be ground to said block for the purpose of grinding a concave surface in the face of the tool.

In testimony whereof I have signed my name to this specification in the presence of two subscribing witnesses.

THOMAS LUMSDEN.

Witnesses:
　HERBERT HOWARD,
　GEORGE FORSTER.

Copies of this patent may be obtained for five cents each, by addressing the "Commissioner of Patents, Washington, D. C."